(12) United States Patent
Endo et al.

(10) Patent No.: US 9,166,452 B1
(45) Date of Patent: Oct. 20, 2015

(54) SPINDLE MOTOR, DISK DRIVE APPARATUS, AND ELECTRONIC DEVICE

(71) Applicant: Nidec Corporation, Kyoto (JP)

(72) Inventors: Takashi Endo, Kyoto (JP); Atsushi Yawata, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/640,126

(22) Filed: Mar. 6, 2015

Related U.S. Application Data

(60) Provisional application No. 62/020,546, filed on Jul. 3, 2014.

(51) Int. Cl.
*G11B 19/20* (2006.01)
*H02K 3/28* (2006.01)

(52) U.S. Cl.
CPC .............. *H02K 3/28* (2013.01); *G11B 19/2009* (2013.01)

(58) Field of Classification Search
CPC ............ G11B 19/2036; G11B 19/2009; F16C 17/107; F16C 33/745; H02K 3/28; H02K 5/225
USPC ...................................................... 360/99.08
See application file for complete search history.

(56) References Cited

U.S. PATENT DOCUMENTS

| | | | |
|---|---|---|---|
| 7,012,191 B1 | 3/2006 | Watanabe et al. | |
| 8,587,896 B1 * | 11/2013 | Ishino et al. | 360/99.08 |
| 8,643,978 B1 * | 2/2014 | Matsumoto et al. | 360/99.08 |
| 8,881,372 B2 * | 11/2014 | Matsuyama et al. | 29/596 |
| 9,047,911 B2 * | 6/2015 | Sugiki | 1/1 |
| 9,082,450 B2 * | 7/2015 | Kosakamoto et al. | 1/1 |
| 2005/0206255 A1 | 9/2005 | Yoshino et al. | |
| 2007/0247010 A1 | 10/2007 | Ichizaki | |
| 2011/0122530 A1 | 5/2011 | Sekii et al. | |
| 2011/0249362 A1 * | 10/2011 | Saichi et al. | 360/99.08 |
| 2012/0200957 A1 | 8/2012 | Yawata | |
| 2013/0049551 A1 | 2/2013 | Tamaoka et al. | |
| 2013/0050872 A1 | 2/2013 | Sekii et al. | |
| 2013/0050873 A1 | 2/2013 | Abe et al. | |
| 2013/0229727 A1 | 9/2013 | Saeki et al. | |
| 2013/0300234 A1 | 11/2013 | Sekii et al. | |
| 2013/0301161 A1 | 11/2013 | Saeki | |
| 2013/0323093 A1 | 12/2013 | Tamaoka et al. | |
| 2014/0153132 A1 * | 6/2014 | Sato et al. | 360/99.08 |
| 2015/0015993 A1 * | 1/2015 | Lee et al. | 360/99.08 |

(Continued)

FOREIGN PATENT DOCUMENTS

| | | |
|---|---|---|
| JP | 05-207717 A | 8/1993 |
| JP | 06-343242 A | 12/1994 |

(Continued)

*Primary Examiner* — Angel Castro
(74) *Attorney, Agent, or Firm* — Keating & Bennett, LLP

(57) ABSTRACT

A spindle motor includes a base portion, a stationary portion, and a circuit substrate disposed in the base portion. The base portion includes a flat plate portion positioned below the rotary portion and a through-hole extending from an upper surface to a lower surface of the flat plate portion. The flat plate portion includes a first surface positioned between the upper surface and the lower surface of the flat plate portion and disposed within the through-hole. The circuit substrate includes a land portion to which a lead wire extending from a plurality of coils is electrically connected. The land portion is disposed on the first surface. The lead wire is connected to the land portion by solder within the through-hole.

25 Claims, 11 Drawing Sheets

(56) References Cited

U.S. PATENT DOCUMENTS

2015/0036475 A1 * 2/2015 Shiraishi et al. .......... 369/258.1
2015/0138670 A1 * 5/2015 Sato et al. ................. 360/99.08

FOREIGN PATENT DOCUMENTS

| JP | 08-33253 A | 2/1996 |
|----|------------|--------|
| JP | 2008-005588 A | 1/2008 |

* cited by examiner

SPINDLE MOTOR, DISK DRIVE APPARATUS, AND ELECTRONIC DEVICE

BACKGROUND OF THE INVENTION

1. Field of the Invention

The present invention relates to a spindle motor, a disk drive apparatus including the spindle motor, and an electronic device including the spindle motor.

2. Description of the Related Art

A spindle motor for rotating a disk or an impeller is mounted to a hard disk apparatus, an optical disk apparatus, or a fan. The spindle motor includes a stationary portion fixed to a housing of an apparatus and a rotary portion which rotates while supporting a disk or an impeller. The spindle motor generates a torque about a center axis using a magnetic flux generated between the stationary portion and the rotary portion, thereby rotating the rotary portion with respect to the stationary portion.

A conventional spindle motor is disclosed in, e.g., Japanese Patent Application Publication No. 2005-210787 (JP 2005-210787A). The spindle motor of JP 2005-210787A includes a rotating body to which a driving magnet is fixed, a stator disposed in an opposing relationship with the rotating body and provided with coils, a base to which the stator is fixed, an insulation sheet provided in at least a portion between the stator and the base, and a wiring substrate provided in the base at the outside of the motor. Mutually communicating holes are provided in the base, the insulation sheet, and the wiring substrate. End portions of lead wires of the plurality of coils are drawn out to the outside of the motor through the holes.

In this spindle motor, the end portions of the lead wires of the plurality of coils are connected to the wiring substrate by solder at the outside of the motor. As shown in FIG. 5 of JP 2005-210787A, it is necessary to reduce the thickness of the portion of the base where solder is disposed. Particularly, in recent years, a spindle motor is becoming smaller in thickness. Along with the reduction in the thickness of the spindle motor, there is a need to sufficiently secure the rigidity of the base. In order to increase the rigidity of the base, it is desirable to increase the thickness of the base. However, lead wires which constitute the plurality of coils need to be connected to a circuit substrate through the use of solder. In the related art, solder is disposed on a lower surface or an upper surface of a base. In order to limit the height of the solder to fall within the height of the motor, it is required to reduce the thickness of the base. If the thickness of the base is reduced in order to limit the height of the solder to fall within the height of the motor, there is a possibility that the rigidity of the base is impaired. Thus, a demand has existed for the arrangement of solder which secures the desired thickness of the base.

SUMMARY OF THE INVENTION

In accordance with one illustrative preferred embodiment of the present invention, a spindle motor includes a stationary portion and a rotary portion including a magnet, the rotary portion being configured to rotate about a center axis extending up and down, wherein the stationary portion includes a base portion, a stator provided with a plurality of coils and positioned above the base portion, and a circuit substrate disposed in the base portion. The base portion preferably includes a flat plate portion positioned below the rotary portion and extending radially outward with respect to the center axis, and at least one through-hole extending through an upper surface to a lower surface of the flat plate portion. The flat plate portion includes a first surface positioned between the upper surface and the lower surface of the flat plate portion and disposed within the through-hole, the circuit substrate includes a land portion to which at least one lead wire extending from the plurality of coils is electrically connected, the land portion being disposed on the first surface, and the lead wire is connected to the land portion by solder within the through-hole.

On a disk drive apparatus according to a further illustrative preferred embodiment of the present invention, a disk is mounted. The disk drive apparatus includes a spindle motor, an access portion, and a housing. The access portion is configured to perform at least one of reading and writing operations with respect to the disk. The housing accommodates the spindle motor and the access portion.

An electronic device according to another illustrative preferred embodiment of the present invention includes the spindle motor.

According to the illustrative preferred embodiments of the present invention, the solder which interconnects the lead wire extending from the coil and the land portion of the circuit substrate is disposed on the first surface positioned in the through-hole of the base portion. This configuration makes it possible to increase the thickness of the base portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will now be described in detail with reference to the accompanying drawings. In the present application, the direction parallel to a center axis of a spindle motor will be referred to as an "axial direction." The direction orthogonal to the center axis of the spindle motor will be referred to as a "radial direction." The direction extending along an arc centered at the center axis of the spindle motor will be referred to as a "circumferential direction." In the present application, the shape and positional relationship of the respective portions will be described by defining the axial direction as an up-down direction and by defining the side of an armature with respect to a base portion as an upper side. However, the definition of the up-down direction is not intended to limit the in-use direction of the motor according to the preferred embodiments of the present invention.

In the present application, the "parallel direction" encompasses a parallel direction and a substantially parallel direction. Furthermore, the "the orthogonal direction" encompasses an orthogonal direction and a substantially orthogonal direction.

Figure 1:
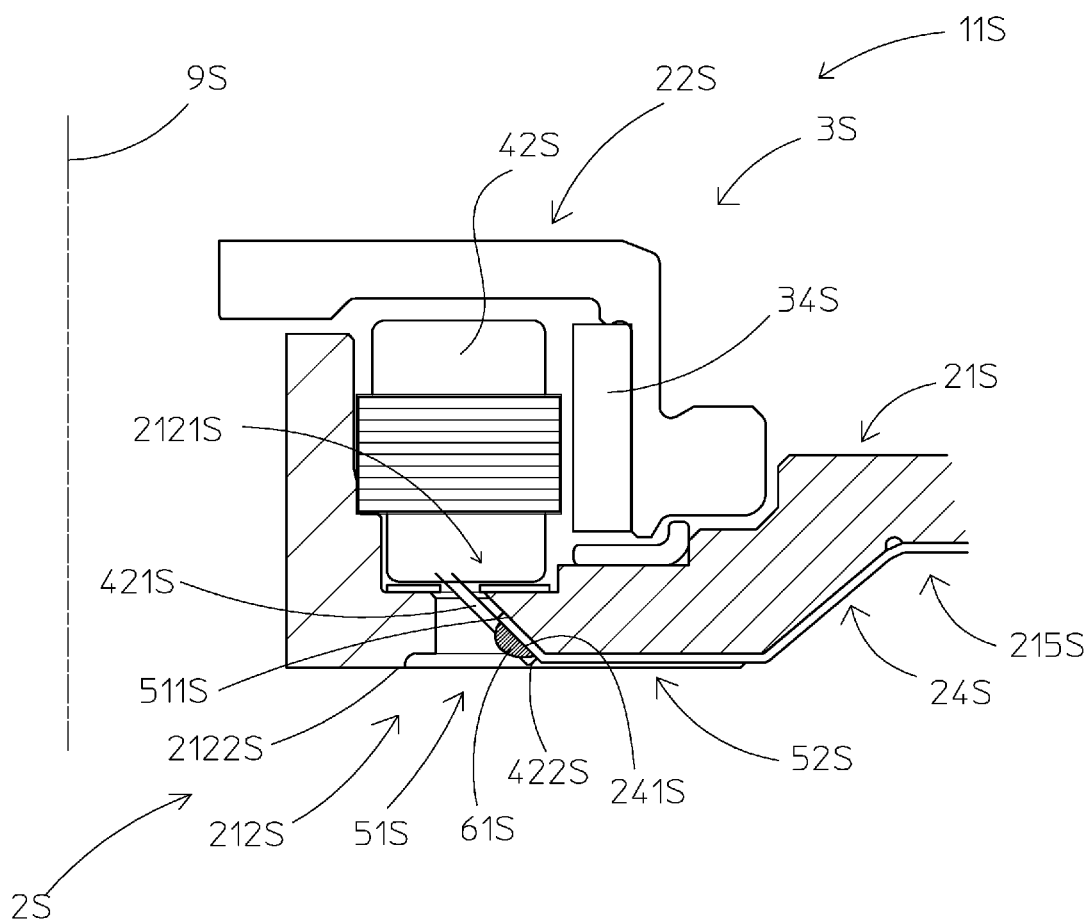
FIG. 1 is a partial vertical sectional view of a spindle motor according to a first preferred embodiment of the present invention.

FIG. 1 is a partial vertical sectional view of a spindle motor 11S according to a first preferred embodiment of the present invention. As shown in FIG. 1, the spindle motor 11S preferably includes a stationary portion 2S and a rotary portion 3S.

The stationary portion 2S preferably includes a base portion 21S, a stator 22S, and a circuit substrate 24S. The base portion 21S is preferably made of metal, for example. As the material of the base portion 21S, it may be possible to use, e.g., aluminum alloy, ferromagnetic or nonmagnetic stainless steel, or magnesium alloy. The stator 22S is positioned above the base portion 21S. The circuit substrate 24S is disposed at the base portion 21S. More specifically, the circuit substrate 24S is disposed on a lower surface 215S of the base portion 21S. The circuit substrate 24S is electrically connected to a plurality of coils 42S of the stator 22S.

The rotary portion 3S is supported so as to rotate about a center axis 9S extending up and down. The rotary portion 3S preferably includes a magnet 34S. During driving of the spindle motor 11S, a torque is generated by a magnetic flux generated between the stator 22S and the magnet 34S.

As shown in FIG. 1, the base portion 21S preferably includes a flat plate portion 212S and a through-hole 51S. The flat plate portion 212S is positioned below the rotary portion 3S and extends radially outward with respect to the center axis 9S. The through-hole 51S extends between an upper surface 2121S and a lower surface 2122S of the flat plate portion 212S. At least one through-hole 51S is preferably provided in the base portion 21S. A base groove portion 52S is provided on the lower surface 2122S of the base portion 21S. The base groove portion 52S is joined to the through-hole 51S. The base groove portion 52S protrudes upward from the lower surface 2122S of the base portion 21S. The base groove portion 52S extends radially outward from the region of the flat plate portion 212S where a lower opening of the through-hole 51S is located. The through-hole 51S is preferably sealed by an adhesive agent, for example. In the drawings, the adhesive agent which covers the through-hole 51S is not shown. The adhesive agent which covers the through-hole 51S preferably extends to the base groove portion 52S, for example.

The circuit substrate 24S is disposed in the base groove portion 52S. The circuit substrate 24S is preferably fixed to a bottom surface of the base groove portion 52S by an adhesive agent or an adhesive material, for example. The circuit substrate 24S extends into the through-hole 51S from the lower surface 2122S of the flat plate portion 212S. The thickness of the circuit substrate 24S is smaller than the depth from the lower surface 2122S of the base portion 21S to the bottom surface of the base groove portion 52S. Land portions 241S are disposed at a tip portion of the circuit substrate 24S. The number of the land portions 241S is the same as the number of lead wires 421S extending from the plurality of coils 42S. One or more lead wires extending from the plurality of coils are electrically connected to the land portions 241S.

The flat plate portion 212S preferably includes a first surface 511S on which the land portions 241S of the circuit substrate 24S are disposed. The first surface 511S is positioned between the upper surface 2121S and the lower surface 2122S of the flat plate portion 212S and is positioned within the through-hole 51S. As can be seen in FIG. 1, the first surface 511S is preferably a slanted surface inclined with respect to the center axis 9S. The axial thickness between the first surface 511S and the upper surface 2121S of the flat plate portion 212S becomes smaller as the first surface 511S extends radially inward. The land portions 241S are preferably fixed to the first surface 511S by an adhesive agent or an adhesive material, for example.

The lead wires 421S are disposed on the land portions 241S within the through-hole 51S and are connected to the land portions 241S by solder bumps 61S. The tip portions 422S of the lead wires 421S protrude downward from the solder bumps 61S and are positioned above the lower surface 2122S of the flat plate portion 212S. The solder bumps 61S are accommodated within the through-hole 51S. Preferably, the solder bumps 61S as a whole are accommodated within the through-hole 51S. Alternatively, at least a portion of each solder bump 61S may not be accommodated within the through-hole 51S. It is preferable that the solder bumps 61S are positioned above the lower surface 2122S of the flat plate portion 212S. By allowing the solder bumps 61S to be accommodated within the through-hole 51S, it is possible to increase the thickness of the base portion 21S. In addition, it is preferable that the depth of the base groove portion 52S is set so as to accommodate the thickness of the circuit substrate 24S. It is therefore possible to further increase the thickness of the base portion 21S.

Figure 2:
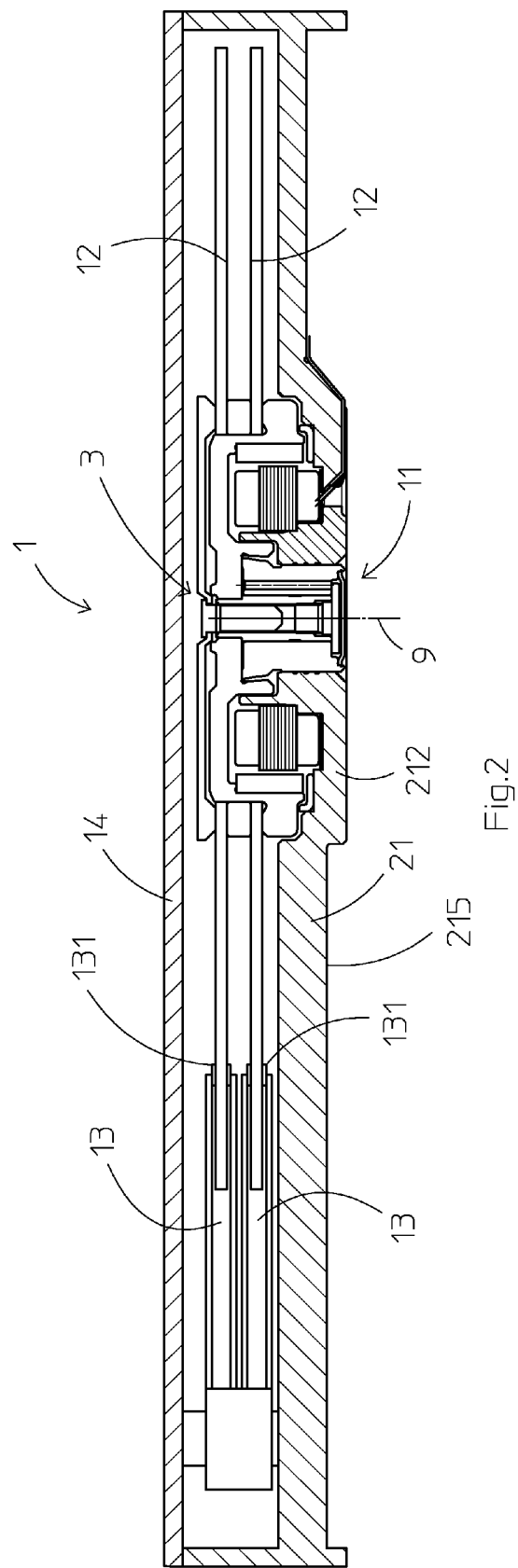
FIG. 2 is a vertical sectional view of a disk drive apparatus according to a second preferred embodiment of the present invention.

FIG. 2 is a vertical sectional view of a disk drive apparatus 1 according to a second preferred embodiment of the present invention. The disk drive apparatus 1 is an apparatus which rotates, e.g., magnetic disks 12, and performs information reading and writing operations with respect to the magnetic disks 12. As shown in FIG. 2, the disk drive apparatus 1 preferably includes a spindle motor 11, magnetic disks 12, an access portion 13, and a cover 14.

The spindle motor 11 rotates the magnetic disks 12 about a center axis 9 while supporting the magnetic disks 12. The spindle motor 11 preferably includes a base portion 21 extending in a direction orthogonal to the center axis 9. The top portion of the base portion 21 is covered with the cover 14. The rotary portion 3 of the spindle motor 11, the magnetic disks 12, and the access portion 13 are accommodated within a housing defined by the base portion 21 and the cover 14. The access portion 13 is configured to move heads 131 along the recording surfaces of the magnetic disks 12 and perform information reading and writing operations with respect to the magnetic disks 12.

The disk drive apparatus 1 may include one or more magnetic disks 12, for example. The access portion 13 may be configured to perform only one of the information reading and writing operations with respect to the magnetic disks 12, for example.

Figure 3:
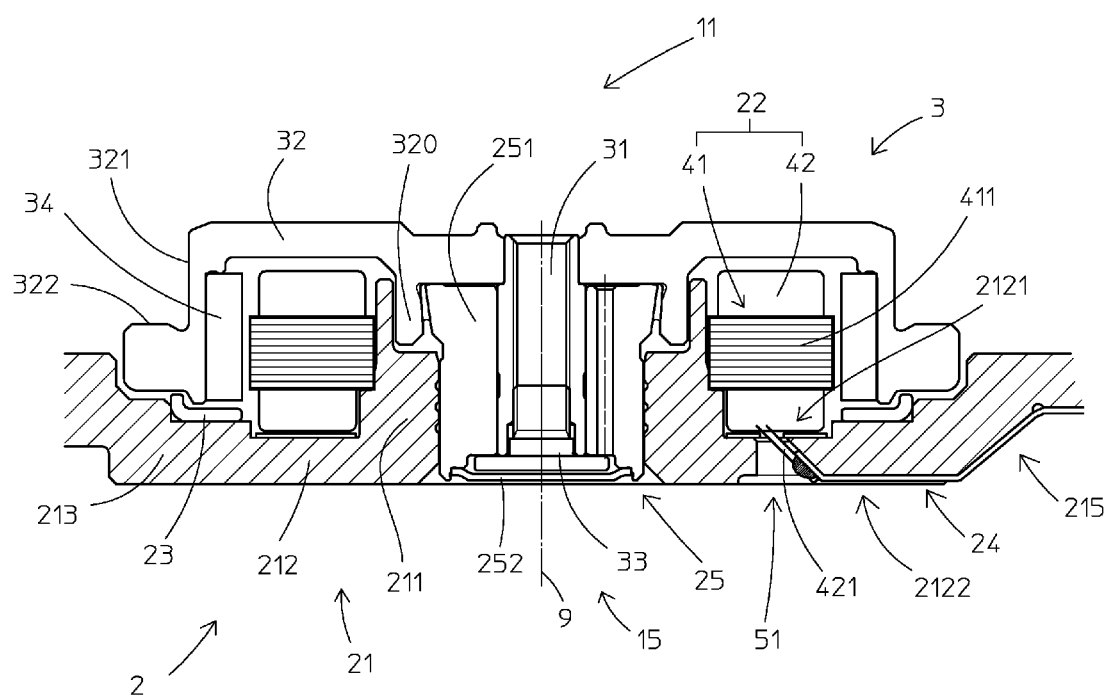
FIG. 3 is a vertical sectional view of a spindle motor according to the second preferred embodiment of the present invention.

Next, description will be made of the detailed configuration of the spindle motor 11. FIG. 3 is a vertical sectional view of the spindle motor 11. As shown in FIG. 3, the spindle motor 11 preferably includes a stationary portion 2 and a rotary portion 3. The stationary portion 2 is stationary with respect to the base portion 21 and the cover 14. The rotary portion 3 is rotatably supported with respect to the stationary portion 2.

The stationary portion 2 of the present preferred embodiment preferably includes a base portion 21, a stator 22, a thrust yoke 23, a circuit substrate 24, and a stationary bearing portion 25.

The base portion 21 is disposed below the rotary portion 3, the magnetic disks 12, and the access portion 13 and extends in a direction orthogonal to the center axis 9. The base portion 21 is obtained by, for example, casting metal such as aluminum alloy or the like. Alternatively, the base portion 21 may be obtained by other methods such as cutting or pressing. The base portion 21 may include a plurality of members, for example.

The base portion 21 preferably includes a cylinder portion 211, a flat plate portion 212, and an annular wall portion 213. The flat plate portion 212 is positioned below the rotary portion 3 and extends radially outward with respect to the center axis 9. The cylinder portion 211 extends upward in a cylindrical or substantially cylindrical shape from the radial inner end portion of the flat plate portion 212. The annular wall portion 213 preferably has a stepped shape such that the height thereof becomes larger as it extends radially outward from the radial outer end portion of the flat plate portion 212. Alternatively, the annular wall portion 213 may have a slanted shape such that the height thereof becomes gradually larger as it extends radially outward. The base portion 21 preferably includes at least one through-hole 51 extending through an upper surface 2121 and a lower surface 2122 of the flat plate portion 212. The flat plate portion 212 preferably includes a first surface 511. The first surface 511 is positioned between the upper surface 2121 and the lower surface 2122 of the flat plate portion 212 and is disposed within the through-hole 51. As can be seen in FIG. 3, the first surface 511 is preferably a slanted surface inclined with respect to center axis 9. The axial thickness between the first surface 511 and the upper surface 2121 of the flat plate portion 212 becomes smaller as the first surface 511 extends radially inward.

The stator 22, the thrust yoke 23, and the rotary portion 3 are disposed above the flat plate portion 212 and the annular wall portion 213. The circuit substrate 24 is disposed on the lower surfaces of the flat plate portion 212 and the annular wall portion 213.

The stator 22 preferably includes a stator core 41 and a plurality of coils 42. The stator core 41 and the plurality of coils 42 are positioned above the flat plate portion 212. The stator core 41 includes a laminated steel plate configuration obtained by, for example, axially laminating electromagnetic steel plates such as silicon steel plates or the like. The stator core 41 is fixed to the outer circumferential surface of the cylinder portion 211. The stator core 41 preferably includes a plurality of teeth 411 protruding radially outward. Preferably, the teeth 411 are disposed at regular or substantially regular intervals along the circumferential direction.

The plurality of coils 42 are defined by lead wires wound around the respective teeth 411. The plurality of coils 42 of the present preferred embodiment include three lead wires 421 to supply three-phase currents. The end portions of the respective lead wires 421 are drawn out into the through-hole 51 provided in the flat plate portion 212.

The thrust yoke 23 is an annular member disposed on the upper surface of the annular wall portion 213. As the material of the thrust yoke 23, it may be possible to use, for example, a magnetic body such as an electromagnetic steel plate (e.g., a silicon steel plate), a ferromagnetic stainless steel plate (e.g., SUS430) or a cold-rolled steel plate (e.g., SPCC or SPCE). The thrust yoke 23 is positioned below a magnet 34 which will be described below. A magnetic attraction force is generated between the thrust yoke 23 and the magnet 34. Thus, the rotary portion 3 is attracted toward the stationary portion 2.

Three land portions 241 including copper foils exposed therefrom are disposed in the circuit substrate 24. The land portions 241 are located at the tip portion of the circuit substrate 24. The circuit substrate 24 is positioned on the lower surfaces of the flat plate portion 212 and the annular wall portion 213. The circuit substrate 24 extends from the lower surface 2122 of the flat plate portion 212 into the through-hole 51. The land portions 241 are located on the first surface 511. At least one lead wire drawn out from the plurality of coils is connected to each of the land portions 241. At least a portion of each of the land portions 241 is disposed on the lower surface 2122 of the flat plate portion 212. The three lead wires 421 are respectively soldered to the three land portions 241. Thus, the circuit substrate 24 and the plurality of coils 42 are electrically connected to each other. A current to drive the spindle motor 11 is supplied from an external power supply to the plurality of coils 42 via the circuit substrate 24.

The number of the lead wires 421 is not limited to three. For example, four lead wires may be drawn out from the through-hole 51. Moreover, one or more lead wires may be drawn out from one through-hole 51.

A flexible printed substrate is preferably used as the circuit substrate 24 in the present preferred embodiment. Use of a flexible printed substrate makes it possible to dispose the circuit substrate 24 along the irregular portions of the lower surface of the base portion 21. By using a flexible printed substrate, it is possible to make the axial thickness of the circuit substrate 24 smaller as compared with other substrates. Accordingly, it is possible to reduce the axial thickness of the spindle motor 11.

The stationary bearing portion 25 preferably includes a sleeve 251 and a cap 252. The sleeve 251 is disposed around a shaft 31 so as to extend axially in a cylindrical or substantially cylindrical shape. The lower portion of the sleeve 251 is disposed at the radial inner side of the cylinder portion 211 of the base portion 21 and is fixed to the cylinder portion 211 by, e.g., an adhesive agent. The inner circumferential surface of the sleeve 251 is radially opposed to the outer circumferential surface of the shaft 31. The cap 252 closes a lower opening of the sleeve 251. The sleeve 251 may include a plurality of members, for example.

The rotary portion 3 of the present preferred embodiment preferably includes a shaft 31, a hub 32, a fixing screw 33, and a magnet 34.

The shaft 31 is disposed at the radial inner side of the sleeve 251 so as to extend in the axial direction. As the material of the shaft 31, it may be possible to use, e.g., metal such as ferromagnetic or nonmagnetic stainless steel or the like. The upper end portion of the shaft 31 protrudes upward beyond the upper surface of the sleeve 251.

The hub 32 extends radially outward from the peripheral edge of the upper end portion of the shaft 31. The inner circumferential portion of the hub 32 is fixed to the upper end portion of the shaft 31. As shown in FIG. 3, the hub 32 of the present preferred embodiment preferably includes an annular protrusion 320 protruding downward. The inner circumferential surface of the annular protrusion 320 is radially opposed to the outer circumferential surface of the sleeve 251, thus defining an oil seal portion which retains lubricating oil.

The hub 32 preferably includes a first holding surface 321 having a cylindrical or substantially cylindrical shape and a second holding surface 322 extending radially outward from the lower end portion of the first holding surface 321. The inner circumferential portions of the magnetic disks 12 make contact with at least a portion of the first holding surface 321. The lower surface of one of the magnetic disks 12 makes contact with at least a portion of the second holding surface 322. Thus, the magnetic disks 12 are held in place.

Lubricating oil preferably is provided between the shaft 31, the hub 32 and the fixing screw 33, and the stationary bearing portion 25. A liquid surface of the lubricating oil is provided in the oil seal portion. As the lubricating oil, it may be possible to use, e.g., polyol ester-based oil or diester-based oil. The shaft 31 is rotatably supported by the stationary bearing portion 25 through the lubricating oil.

That is, in the present preferred embodiment, a bearing mechanism 15 preferably is configured by the sleeve 251 and the cap 252 which belong to the stationary portion 2, the shaft 31, the hub 32, and the fixing screw 33 which belong to the rotary portion 3, and the lubricating oil existing between them. The bearing mechanism 15 is accommodated within the cylinder portion 211. The rotary portion 3 is supported by the bearing mechanism 15 and is rotated about the center axis 9.

The magnet 34 is disposed radially outward of the stator 22 and is fixed to the hub 32. The magnet 34 preferably has a ring shape. The inner circumferential surface of the magnet 34 is radially opposed to the radial outer end surfaces of the teeth 411. On the inner circumferential surface of the magnet 34, an N pole and an S pole are alternately magnetized along the circumferential direction.

A plurality of magnets may be used in place of the ring-shaped magnet 34. In case of using a plurality of magnets, the magnets may be disposed along the circumferential direction such that an N pole and an S pole are alternately arranged side by side.

In the present spindle motor 11, if a current is supplied to the plurality of coils 42 via the circuit substrate 24, magnetic fluxes are generated in the teeth 411. A circumferential torque is generated by the action of the magnetic fluxes between the teeth 411 and the magnet 34. As a result, the rotary portion 3 is rotated about the center axis 9 with respect to the stationary portion 2. The magnetic disks 12 supported by the hub 32 are rotated about the center axis 9 together with the rotary portion 3.

Figure 4:
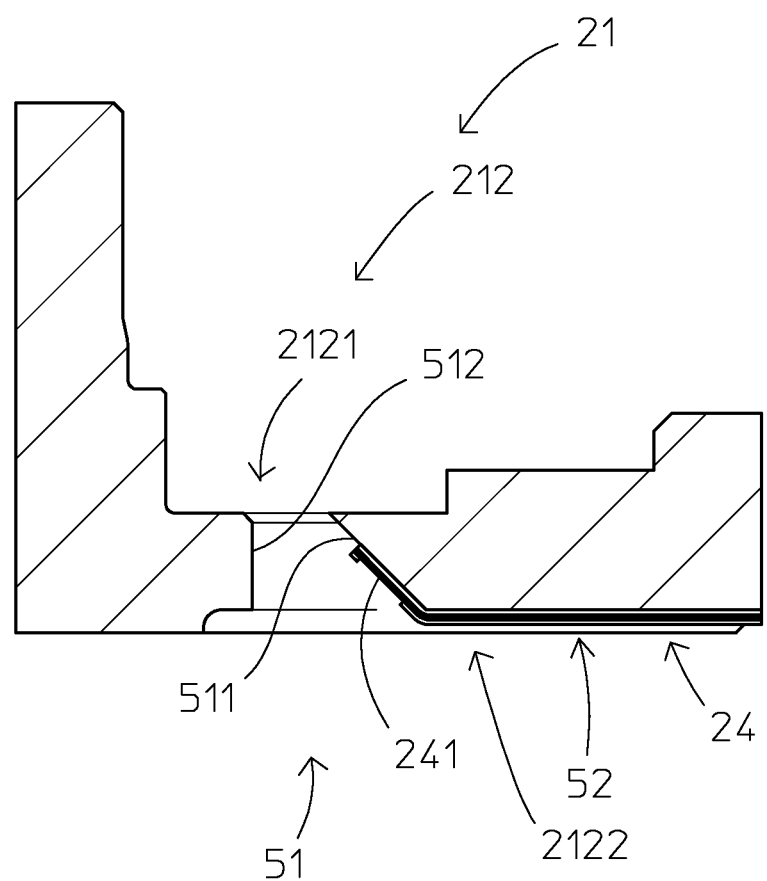
FIG. 4 is a partial vertical sectional view of a base portion according to the second preferred embodiment of the present invention.
Figure 5:
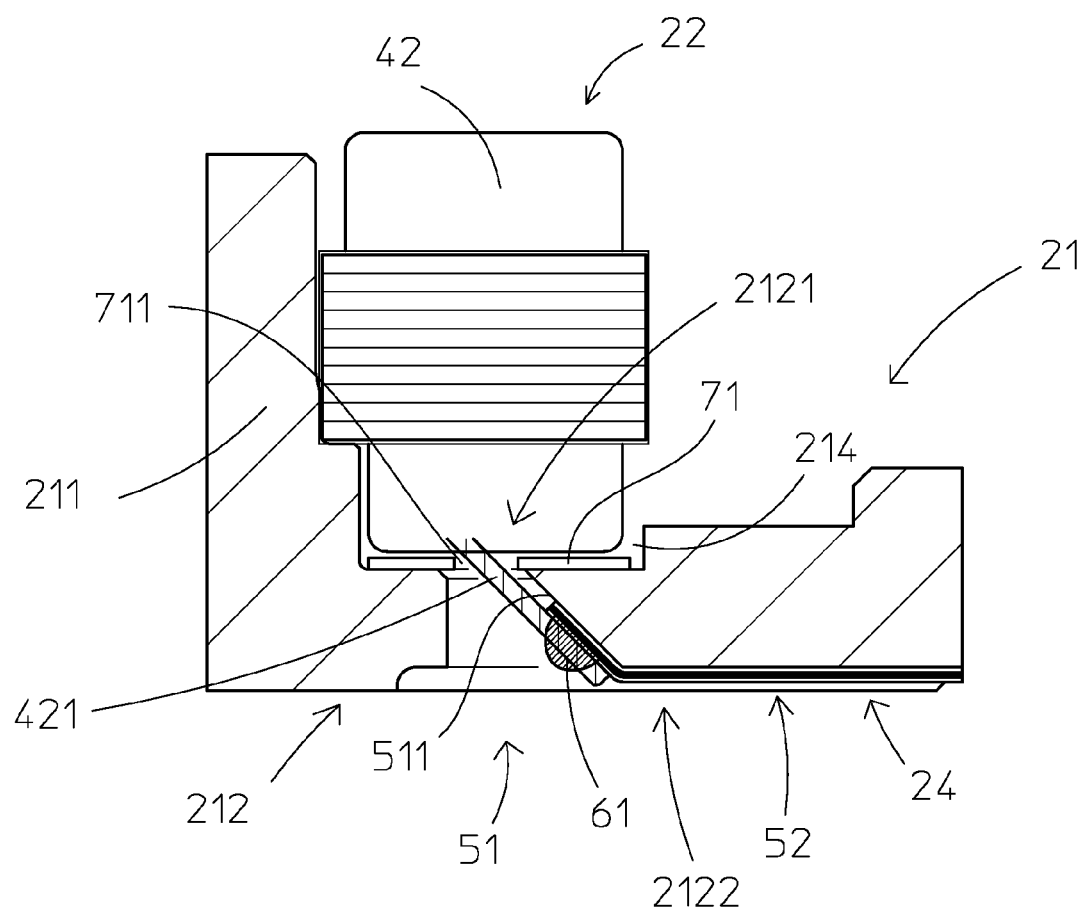
FIG. 5 is a partial vertical sectional view of a stationary portion according to the second preferred embodiment of the present invention.
Figure 6:
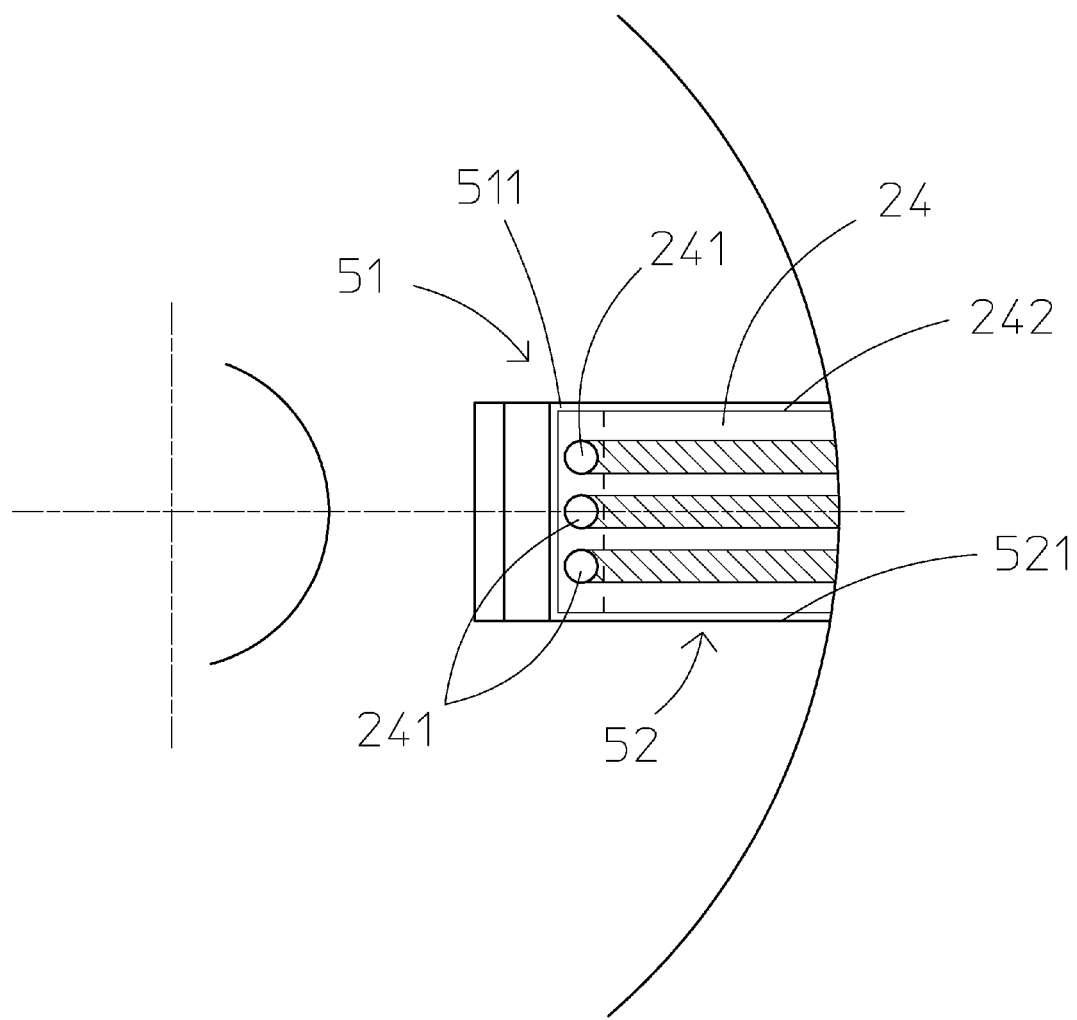
FIG. 6 is a partial bottom view of the base portion according to the second preferred embodiment of the present invention.
Figure 7:
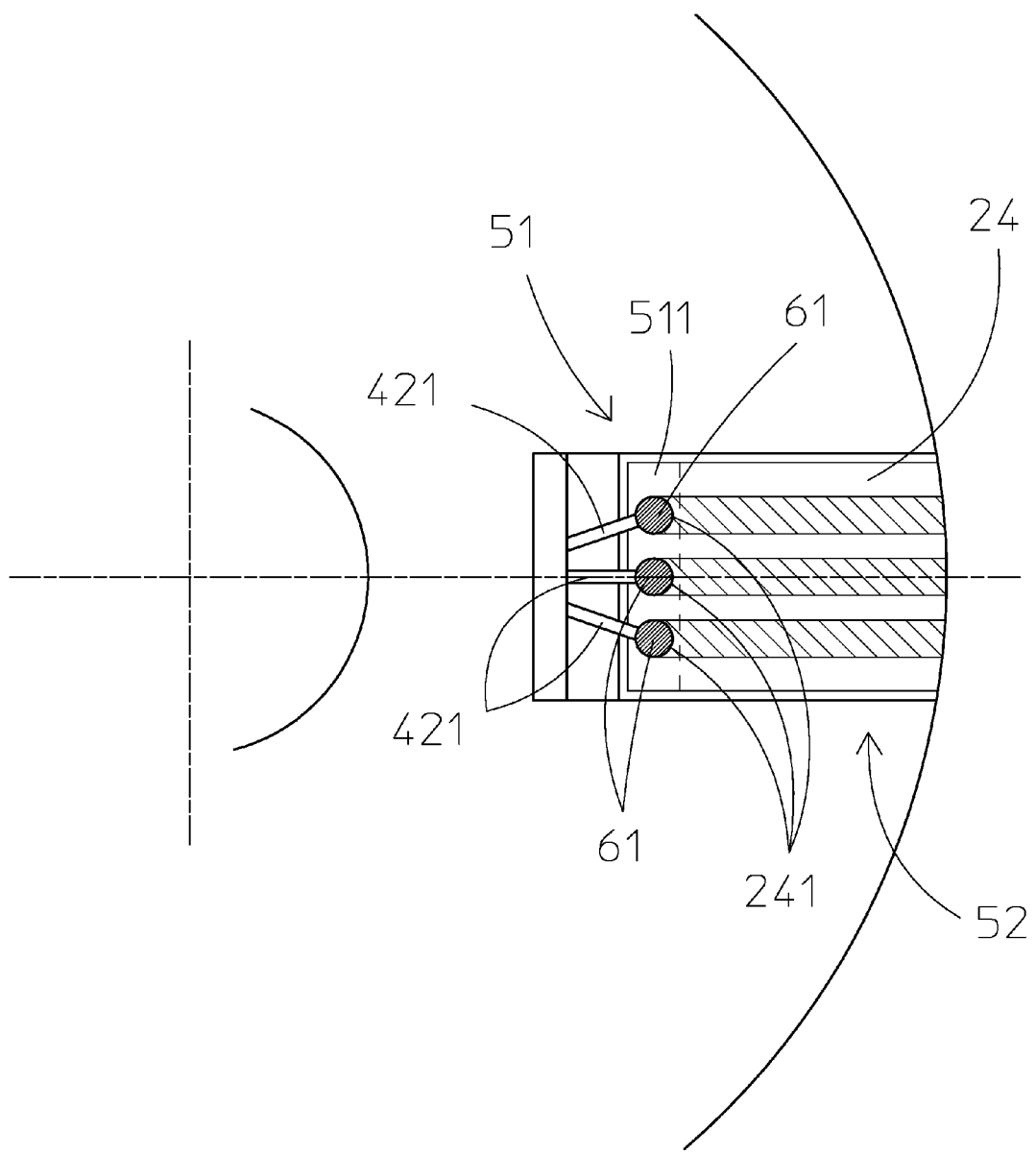
FIG. 7 is a partial bottom view of the stationary portion according to the second preferred embodiment of the present invention.
Figure 8:
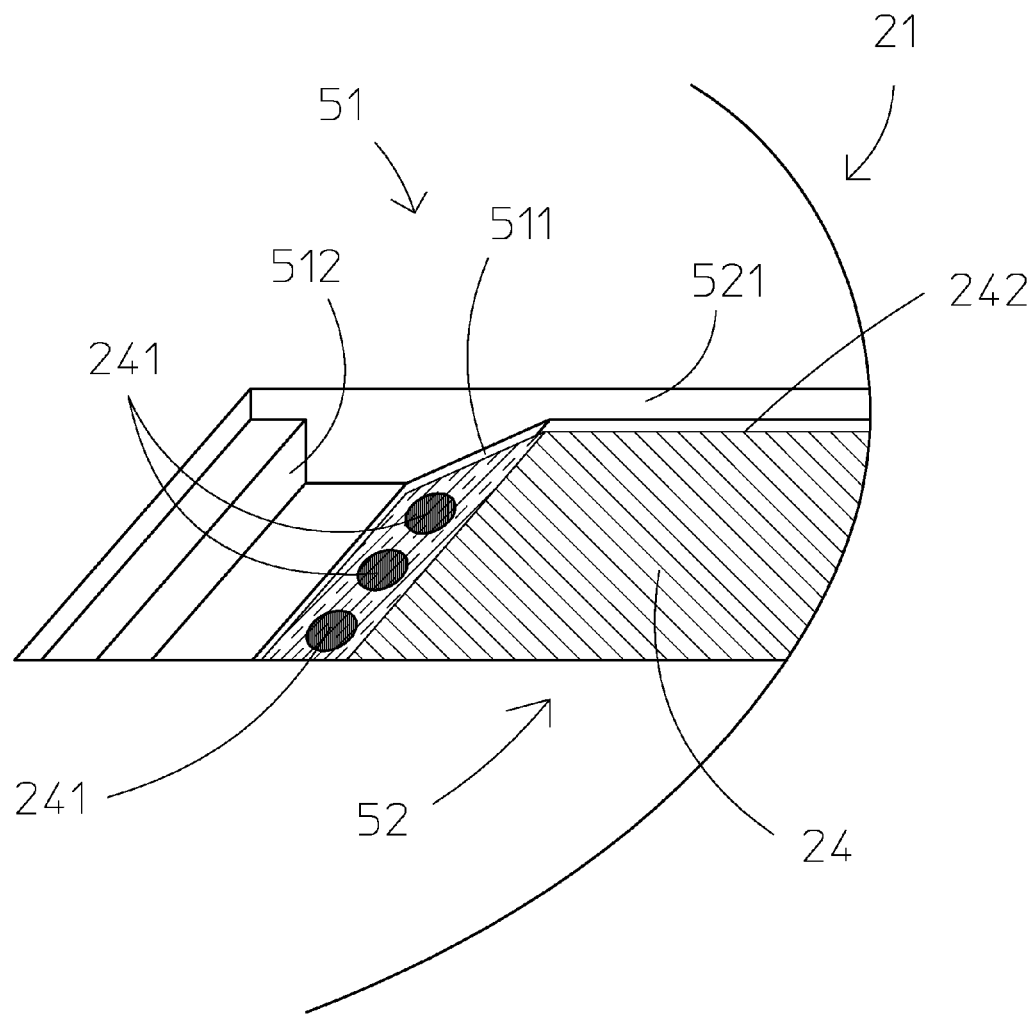
FIG. 8 is a partial perspective view of the base portion according to the second preferred embodiment of the present invention.

FIG. 4 is a partial vertical sectional view showing the base portion 21 and the circuit substrate 24. FIG. 5 is a partial vertical sectional view of the stationary portion showing the base portion 21, the circuit substrate 24, the stator 22, and the solder bumps 61. FIG. 6 is a partial bottom view showing the base portion 21 and the circuit substrate 24. FIG. 7 is a partial bottom view of the stationary portion showing the base portion 21, the circuit substrate 24, the lead wires 421, and the solder bumps 61. FIG. 8 is a partial perspective view showing the base portion 21 and the circuit substrate 24. In the following description, reference will be appropriately made to FIG. 3 and FIGS. 4 to 8.

As shown in FIGS. 4 and 5, the base portion 21 preferably includes a flat plate portion 212 and a through-hole 51 axially extending through the flat plate portion 212. The flat plate portion 212 preferably includes a base groove portion 52. The flat plate portion 212 further includes a first surface 511. The first surface 511 is positioned between an upper surface 2121 and a lower surface 2122 of the flat plate portion 212 and is disposed within the through-hole 51. The first surface 511 is a surface continuously extending from the bottom surface of the base groove portion 52. The first surface 511 is preferably a slanted surface inclined with respect to the center axis. The first surface 511 obliquely extends from the bottom surface of the base groove portion 52 toward the upper surface 2121 of the flat plate portion 212. That is, the axial thickness between the first surface 511 and the upper surface 2121 of the flat plate portion 212 becomes smaller as the first surface 511 extends radially inward.

The flat plate portion 212 preferably includes a second surface 512 positioned within the through-hole 51 and radially opposed to the first surface 511. Preferably, the second surface 512 is a surface parallel to the center axis. As explained above, a surface parallel to the center axis encompasses a surface substantially parallel to the center axis. The second surface 512 may be a slanted surface parallel to the first surface 511. The second surface 512 may be a slanted surface having a different inclination angle than the first surface 511.

Three land portions 241 including copper foils exposed therefrom are disposed in the tip portion of the circuit substrate 24. The circuit substrate 24 is disposed on the bottom surface of the base groove portion 52. The tip portion of the circuit substrate 24 including the land portions 241 is disposed on the first surface 511 so as to extend along the first surface 511. Preferably, the land portions 241 as a whole are disposed on the slanted first surface 511. The land portions 241 may be partially disposed on the bottom surface of the base groove portion 52.

As shown in FIG. 5, the stator 22 is positioned above the flat plate portion 212 and is fixed to the outer circumferential surface of the cylinder portion 211. The flat plate portion 212 preferably includes a recess portion 214 which accommodates the plurality of coils 42 and an insulation sheet 71 disposed on the bottom surface of the recess portion 214. The recess portion 214 is positioned on the upper surface 2121 of the flat plate portion 212. Preferably, the recess portion 214 is an annular recess portion which accommodates the plurality of coils 42. Alternatively, the recess portion 214 may include a plurality of recess portions disposed along the circumferential direction so as to respectively accommodate the plurality of coils 42. As the material of the insulation sheet 71, it may be possible to use an insulating material, e.g., a resin such as a polyethylene terephthalate (PET) or the like. The insulation sheet 71 preferably includes a sheet through-hole 711 whose diameter is smaller than the width of the upper opening of the through-hole 51. The sheet through-hole 711 extends through the bottom surface of the recess portion 214 and the bottom surface of the base groove portion 52. At least a portion of each of the land portions 241 is positioned lower than the bottom surface of the recess portion 214 and higher than the bottom surface of the base groove portion 52. The lead wires 421 extending from the plurality of coils 42 are drawn out into the through-hole 51 via the sheet through-hole 711. The lead wires 421 are connected to the land portions 241 by the solder bumps 61. Since the diameter of the sheet through-hole 711 is smaller than the width of the upper opening of the through-hole 51, it is possible to prevent the lead wires 421 from making contact with the base portion 21. By preventing the lead wires 421 and the base portion 21 from making contact with each other, there is no need to consider a withstand voltage.

The solder bumps 61 are positioned within the through-hole 51. Preferably, the solder bumps 61 as a whole are accommodated within the through-hole 51. A portion of each of the solder bumps 61 may protrude from the lower opening of the through-hole 51. In this case, it is preferred that the solder bumps 61 are disposed at a higher position than the lower surface of the base portion 21.

As shown in FIGS. 4 and 5, the first surface 511 is a slanted surface positioned within the through-hole 51 and inclined with respect to the center axis 9. The lead wires 421 and the land portions 241 are connected at the first surface 511 by the solder bumps 61. Since the solder bumps 61 are disposed within the through-hole 51, it is possible to increase the axial thickness of the base portion 21. In the related art, the base groove portion 52 has a depth which accommodates the thickness of the circuit substrate 24, the thickness of the lead wires 421, and the height of the solder bumps 61. In the present preferred embodiment, the lead wires 421 and the solder bumps 61 are accommodated within the through-hole 51. For that reason, it is preferable that the base groove portion 52 has a depth large enough to accommodate the thickness of the circuit substrate 24. That is, it is possible to increase the thickness of the base portion 21 just as much as the thickness of the lead wires 421 plus the height of the solder bumps 61.

As shown in FIGS. 6 and 8, the flat plate portion 212 preferably includes a base groove portion 52 which accommodates the circuit substrate 24. The bottom surface of the base groove portion 52 is joined to the first surface 511 at a radial inner end thereof. The circuit substrate 24 is preferably fixed to the bottom surface of the base groove portion 52 by an adhesive agent or an adhesive material, for example. The tip portion of the circuit substrate 24 including the land portions 241 is preferably fixed to the first surface 511 by an adhesive agent or an adhesive material, for example.

The base groove portion 52 preferably includes a groove sidewall surface 521 axially extending from the lower surface 215 of the base portion 21 toward the bottom surface of the base groove portion 52. The groove sidewall surface 521 is opposed to a substrate side surface 242 of the circuit substrate 24. Preferably, the groove sidewall surface 521 extends continuously from the outside of the base portion 21 to the first surface 511. The groove sidewall surface 521 may be a discontinuous surface partially opposed to the substrate side surface 242. Since the groove sidewall surface 521 and the substrate side surface 242 are opposed to each other, it is possible to precisely position the circuit substrate 24 in the base groove portion 52.

As shown in FIG. 7, the lead wires 421 are drawn out from above the flat plate portion 212 into the through-hole 51 and are connected to the respective land portions 241 by the solder bumps 61. While only one through-hole is shown in FIG. 7, there may be provided a plurality of through-holes. In other words, three lead wires may be respectively connected to the land portions through three base through-holes. Moreover, there may be provided two base through-holes. In this case, three lead wires may be drawn out from arbitrary base through-holes. Since the respective lead wires are drawn out from the respective through-holes, it is possible to prevent the respective lead wires from being erroneously connected to the land portions other than the desired land portions.

Figure 9:
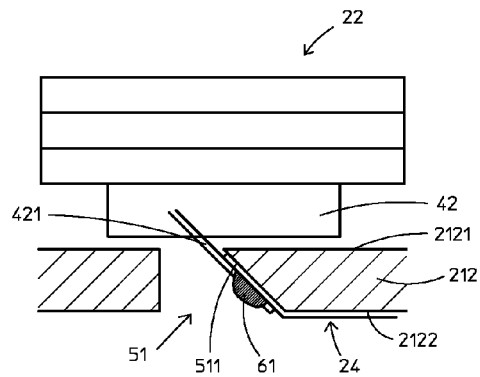
FIG. 9 is a partial vertical sectional view of the stationary portion according to the second preferred embodiment of the present invention

FIG. 9 is a schematic view showing a partial vertical cross-section of the stationary portion 2 according to a second preferred embodiment of the present invention. While illustrative preferred embodiments of the present invention have been described above, the present invention is not limited to the preferred embodiments described above.

Figure 10:
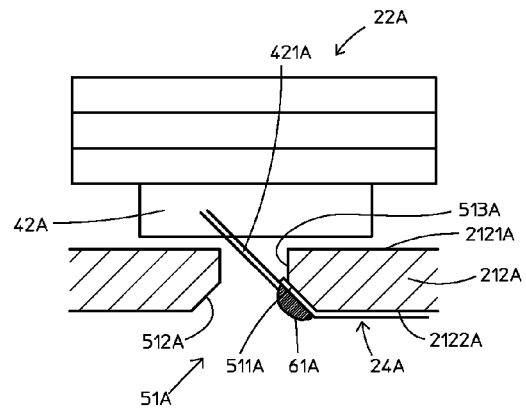
FIG. 10 is a partial vertical sectional view of a stationary portion according to a modified example of a preferred embodiment of the present invention.

FIG. 10 is a schematic view showing a partial vertical cross-section of a stationary portion according to a modified example of a preferred embodiment of the present invention. A flat plate portion 212A preferably includes a through-hole 51A extending in the axial direction. A first surface 511A is a slanted surface located in the through-hole 51A between an upper surface 2121A and a lower surface 2122A of the flat plate portion 212A. The flat plate portion 212A preferably includes a connection surface 513A between the upper end of the first surface 511A and the upper surface 2121A of the flat plate portion 212A. The connection surface 513A is preferably a surface parallel to the center axis. As explained above, a surface parallel to the center axis encompasses a surface substantially parallel to the center axis. The connection surface 513A is positioned between the first surface 511A and the upper surface 2121A of the flat plate portion 212A so as to interconnect the first surface 511A and the upper surface 2121A. The lower surface 2122A, the first surface 511A, and the connection surface 513A of the flat plate portion 212A are preferably continuous surfaces. A circuit substrate 24A is disposed on the lower surface 2122A and the first surface 511A of the flat plate portion 212A. Land portions are disposed on the first surface 511A and are connected to lead wires 421A by solder bumps 61A. A second surface 512A is a slanted surface inclined with respect to the center axis. Alternatively, the second surface 512A may be a surface parallel to the center axis. As compared with the first surface 511 shown in FIG. 9, the first surface 511A shown in FIG. 10 increases the thickness of the base portion in the region near the connection surface 513A. Accordingly, it is possible to obtain a base portion having a higher rigidity.

Figure 11:
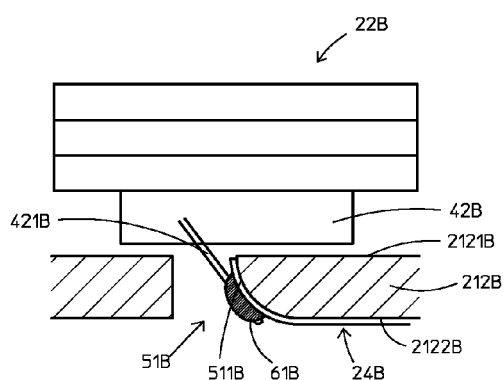
FIG. 11 is a partial vertical sectional view of a stationary portion according to a modified example of a preferred embodiment of the present invention.

FIG. 11 is a schematic view showing a partial vertical cross-section of a stationary portion according to another modified example of a preferred embodiment of the present invention. A first surface 511B is a curved surface located within a through-hole 51B and gently curved from a lower surface 2122B of a flat plate portion 212B toward an upper surface 2121B thereof. Lead wires 421B are connected by solder bumps 61B to land portions disposed on the curved first surface 511B. As compared with the first surface 511 shown in FIG. 9, the first surface 511B shown in FIG. 11 increases the thickness of the base portion. Accordingly, it is possible to obtain a base portion having a higher rigidity.

Figure 12:
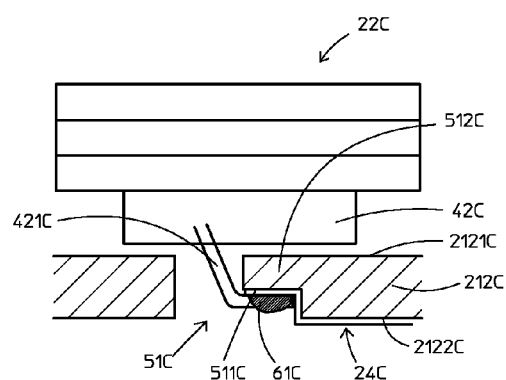
FIG. 12 is a partial vertical sectional view of a stationary portion according to a modified example of a preferred embodiment of the present invention.

FIG. 12 is a schematic view showing a partial vertical cross-section of a stationary portion according to another modified example of a preferred embodiment of the present invention. A flat plate portion 212C preferably includes a stepped portion 512C disposed within a through-hole 51C and protruding upward from a lower surface 2122C of the flat plate portion 212C. A first surface 511C is a bottom surface of the stepped portion 512C. The axial thickness of the stepped portion 512C is smaller than the axial thickness of the flat plate portion 212C. The first surface 511C is disposed on the bottom surface of the stepped portion 512C. Lead wires 421C are connected by solder bumps 61C to land portions disposed on the first surface 511C. By providing the stepped portion 512C, it is possible to increase the thickness of the base portion.

Figure 13:
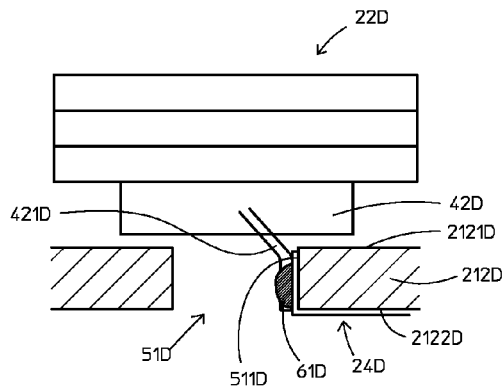
FIG. 13 is a partial vertical sectional view of a stationary portion according to a modified example of a preferred embodiment of the present invention.

FIG. 13 is a schematic view showing a partial vertical cross-section of a stationary portion according to another modified example of a preferred embodiment of the present invention. A first surface 511D is a surface parallel to the center axis. As explained above, a surface parallel to the center axis encompasses a surface substantially parallel to the center axis. Lead wires 421D are connected by solder bumps 61D to land portions disposed on the first surface 511D. A dimension obtained by adding the height of the solder bumps 61D and the thickness of the lead wires 421D is smaller than a radial width of the through-hole 51D. Accordingly, even when thick lead wires are used, the solder bumps 61D are accommodated within the through-hole 51D. It is therefore possible to increase the thickness of the base portion.

Figure 14:
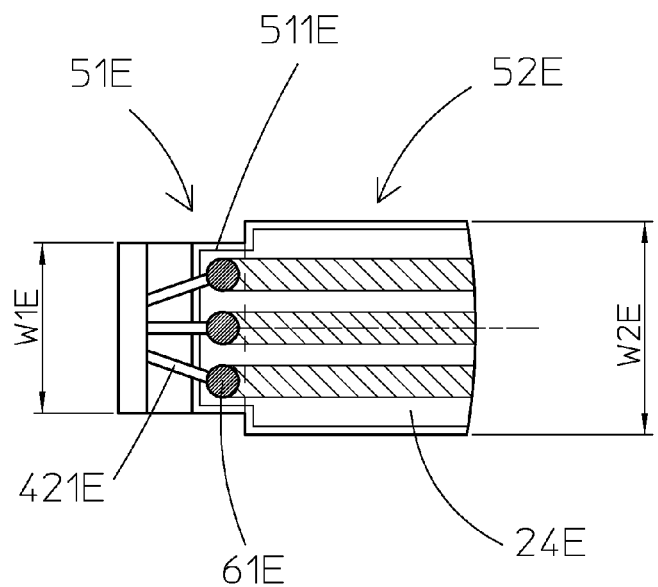
FIG. 14 is a partial bottom view of a stationary portion according to a modified example of a preferred embodiment of the present invention.

FIG. 14 is a partial bottom view of a stationary portion according to another modified example of a preferred embodiment of the present invention. A circumferential width W1E of a first surface 511E is smaller than a circumferential width W2E of a base groove portion 52E. By reducing the circumferential width W1E of the first surface 511E, it is possible to reduce the size of the through-hole 51E. Since the area of the first surface 511E becomes smaller where the base portion is thin, it is possible to increase the rigidity of the base portion around the through-hole 51E.

Figure 15:
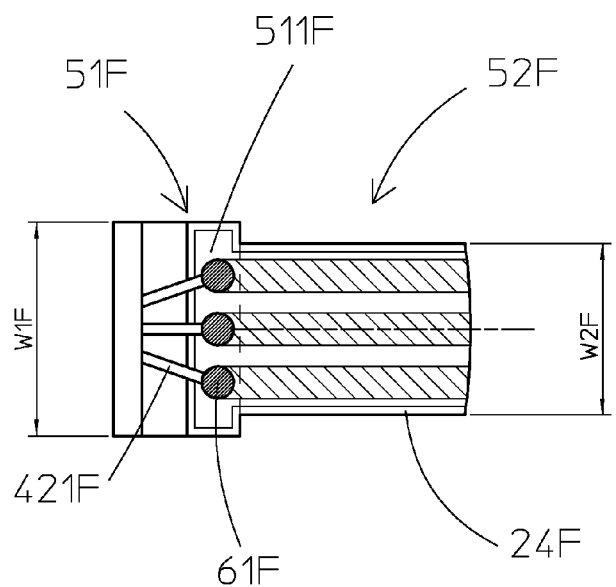
FIG. 15 is a partial bottom view of a stationary portion according to a modified example of a preferred embodiment of the present invention.
Figure 16:
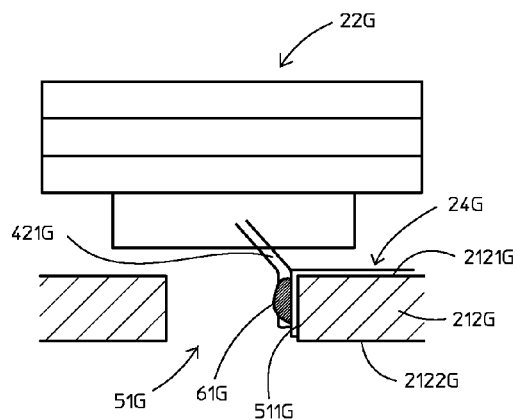
FIG. 16 is a partial vertical sectional view of a stationary portion according to a modified example of a preferred embodiment of the present invention.
Figure 17:
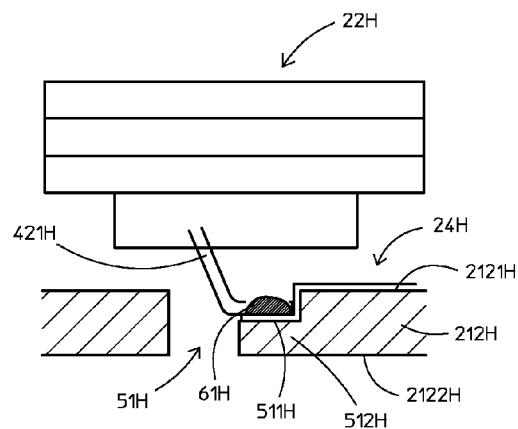
FIG. 17 is a partial vertical sectional view of a stationary portion according to a modified example of a preferred embodiment of the present invention.
Figure 18:
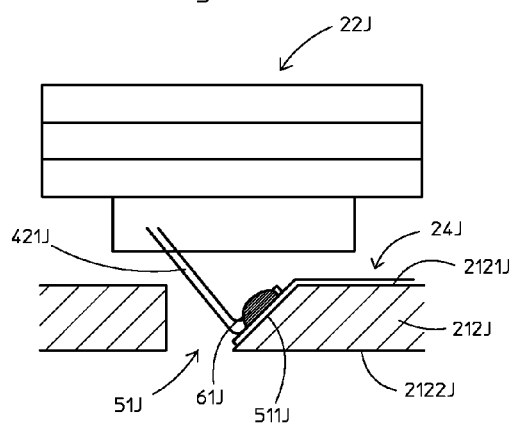
FIG. 18 is a partial vertical sectional view of a stationary portion according to a modified example of a preferred embodiment of the present invention.
Figure 19:
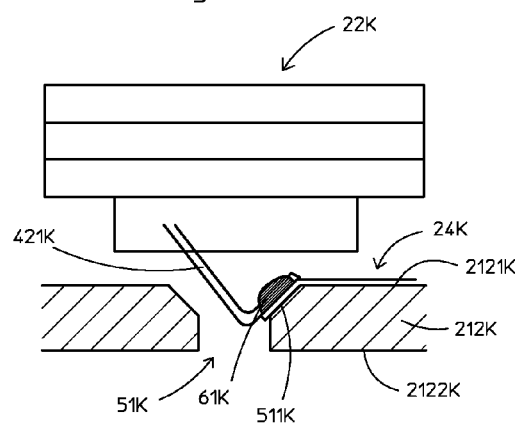
FIG. 19 is a partial vertical sectional view of a stationary portion according to a modified example of a preferred embodiment of the present invention.
Figure 20:
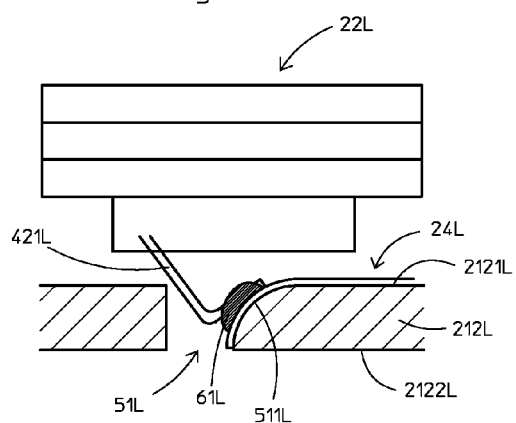
FIG. 20 is a partial vertical sectional view of a stationary portion according to a modified example of a preferred embodiment of the present invention.

FIG. 15 is a partial bottom view of a stationary portion according to another modified example of a preferred embodiment of the present invention. A circumferential width W1F of a first surface 511F is larger than a circumferential width W2F of a base groove portion 52F. By increasing the circumferential width W1F of a first surface 511F, the area that accommodates the solder bumps 61F becomes wider. This makes it easy to perform soldering. Since the width W2F of the base groove portion 52F becomes smaller, it is possible to increase the rigidity of the base portion around the base groove portion 52F.

FIGS. 16 to 20 are schematic views of partial vertical cross-sections of stationary portions according to other modified examples of a preferred embodiment of the present invention. The technical contents of these modified examples are preferably the same as those of the modified examples of a preferred embodiment of the present invention shown in FIGS. 9 to 13. Circuit substrates 24G to 24L are respectively disposed on upper surfaces 2121G to 2121L of flat plate portions 212G to 212L. The end portions of the circuit substrates 24G to 24L including the land portions are bent from the upper surfaces 2121G to 2121L of the flat plate portions 212G to 212L toward through-holes 51G to 51L, respectively. Solder bumps 61G to 61L are disposed within the through-holes 51G to 51L, respectively.

In the first and second preferred embodiments described above, the insulation sheet is preferably disposed on the bottom surface of the recess portion. However, the present invention is not limited thereto. For example, the insulation sheet may be omitted as long as it is not necessary to consider the withstand voltage by preventing contact of the lead wires and the base portion 21 with an insulation film coated on the surface of the base portion.

The circuit substrate is not necessarily a flexible printed substrate. For example, the circuit substrate may be a rigid substrate such as a connector or the like. In addition, a main body of a circuit substrate and a substrate including land portions may be interconnected by a separate member.

The spindle motor of the preferred embodiments of present invention and modifications thereof may be applied to different kinds of disk drive apparatuses. The disk drive apparatus may be the one that rotates disks other than magnetic disks, e.g., optical disks. According to preferred embodiments of the present invention and modifications thereof, it is possible to make the disk drive apparatus thinner in the axial direction. Accordingly, preferred embodiments of the present invention and modifications thereof are particularly useful in a spindle motor used in a disk drive apparatus dedicated for use in a thin notebook-type PC or a thin tablet-type PC. The spindle motor according to preferred embodiments of the present invention and modifications thereof may be used not only in a disk drive apparatus but also in different kinds of electronic devices such as a fan and the like.

Furthermore, preferred embodiments of the present invention and modifications thereof may be applied to a spindle motor used in a thin fan mounted for dedicated use in a thin notebook-type PC or a thin tablet-type PC.

In the preferred embodiments of the present invention and modifications thereof described above, description has been made on a so-called shaft-rotation-type motor in which a sleeve is in a stationary portion and a shaft is in a rotary portion. However, the motor according to a preferred embodiment of the present invention may be a so-called shaft-fixed motor in which the shaft is in the stationary portion and the sleeve is in the rotary portion.

Detailed shapes of the respective members may differ from those shown in the drawings of the present application. The respective elements appearing in the preferred embodiments and modified examples described above may be combined appropriately unless a conflict arises.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A spindle motor comprising:
a stationary portion; and
a rotary portion including a magnet, the rotary portion being configured to rotate about a center axis extending in an up and down direction; wherein
the stationary portion includes a base portion, a stator including a plurality of coils and positioned above the base portion, and a circuit substrate disposed in the base portion;
the base portion includes a flat plate portion positioned below the rotary portion and extending radially outward with respect to the center axis, and at least one through-hole extending from an upper surface to a lower surface of the flat plate portion;

the flat plate portion includes a first surface positioned between the upper surface and the lower surface of the flat plate portion and disposed within the through-hole;

the circuit substrate includes a land portion to which at least one lead wire extending from the plurality of coils is electrically connected;

the land portion is disposed on the first surface; and the lead wire is connected to the land portion by solder within the through-hole.

2. The spindle motor of claim 1, wherein the circuit substrate extends from the lower surface of the flat plate portion into the through-hole;

the land portion is positioned in a tip portion of the circuit substrate; and the solder is accommodated within the through-hole.

3. The spindle motor of claim 2, wherein the first surface is a surface parallel or substantially parallel to the center axis.

4. The spindle motor of claim 2, wherein the flat plate portion includes a stepped portion positioned in the through-hole and protruding upward from the lower surface of the flat plate portion, an axial thickness of the stepped portion being smaller than an axial thickness of the flat plate portion; and the first surface is disposed on a bottom surface of the stepped portion.

5. The spindle motor of claim 4, wherein the flat plate portion includes a connection surface positioned between the first surface and the upper surface of the flat plate portion and joined to the first surface and the upper surface of the flat plate portion, the connection surface being a surface parallel or substantially parallel to the center axis.

6. The spindle motor of claim 2, wherein the first surface is a slanted surface inclined with respect to the center axis, an axial thickness between the first surface and the upper surface of the flat plate portion becoming smaller as the first surface extends radially inward.

7. The spindle motor of claim 6, wherein the flat plate portion includes a connection surface positioned between the first surface and the upper surface of the flat plate portion and joined to the first surface and the upper surface of the flat plate portion, the connection surface being a surface parallel or substantially parallel to the center axis.

8. The spindle motor of claim 2, wherein the first surface is a curved surface curving from the lower surface of the flat plate portion toward the upper surface of the flat plate portion.

9. The spindle motor of claim 1, wherein the flat plate portion includes a base groove portion joined to the through-hole and protruding upward from the lower surface of the flat plate portion; and the circuit substrate is disposed in the base groove portion.

10. The spindle motor of claim 9, wherein the first surface is parallel or substantially parallel to the center axis.

11. The spindle motor of claim 9, wherein the flat plate portion includes a stepped portion positioned in the through-hole and protruding upward from the lower surface of the flat plate portion, an axial thickness of the stepped portion being smaller than an axial thickness of the flat plate portion;

the first surface is disposed on a bottom surface of the stepped portion; and at least a portion of the land portion is disposed on the first surface, and the lead wire is connected to the at least a portion of the land portion.

12. The spindle motor of claim 9, wherein the first surface is a slanted surface inclined with respect to the center axis, and an axial thickness between the first surface and the upper surface of the flat plate portion becomes smaller as the first surface extends radially inward.

13. The spindle motor of claim 9, wherein a circumferential width of the first surface is larger than a circumferential width of the base groove portion.

14. The spindle motor of claim 9, wherein a circumferential width of the first surface is smaller than a circumferential width of the base groove portion.

15. The spindle motor of claim 1, wherein the flat plate portion includes a recess portion positioned on the upper surface of the flat plate portion and arranged to accommodate the plurality of coils, and a base groove portion joined to the through-hole and protruding upward from the lower surface of the flat plate portion;

the circuit substrate is disposed in the base groove portion;

the through-hole extends from a bottom surface of the recess portion to a bottom surface of the base groove portion; and at least a portion of the land portion is positioned lower than the bottom surface of the recess portion and higher than the bottom surface of the base groove portion.

16. The spindle motor of claim 15, wherein the flat plate portion includes a stepped portion positioned in the through-hole and protruding upward from the lower surface of the flat plate portion, an axial thickness of the stepped portion being smaller than an axial thickness of the flat plate portion; and the first surface is disposed on a bottom surface of the stepped portion.

17. The spindle motor of claim 15, wherein the first surface is a slanted surface inclined with respect to the center axis, and an axial thickness between the first surface and the upper surface of the flat plate portion becomes smaller as the first surface extends radially inward.

18. The spindle motor of claim 15, wherein the first surface is a curved surface curving from the lower surface of the flat plate portion toward the upper surface of the flat plate portion.

19. The spindle motor of claim 15, wherein a circumferential width of the first surface is larger than a circumferential width of the base groove portion.

20. The spindle motor of claim 15, wherein a circumferential width of the first surface is smaller than a circumferential width of the base groove portion.

21. The spindle motor of claim 1, wherein the circuit substrate is disposed on the upper surface of the flat plate portion;

the circuit substrate extends from the upper surface of the flat plate portion into the through-hole;

the land portion is positioned in a tip portion of the circuit substrate; and at least a portion of the solder is accommodated within the through-hole.

22. The spindle motor of claim 21, wherein the first surface is a slanted surface inclined with respect to the center axis, and an axial thickness between the first surface and the upper surface of the flat plate portion becomes smaller as the first surfaces extends radially inward.

23. The spindle motor of claim 1, wherein a tip portion of the lead wire protrudes downward from the solder and is positioned higher than the lower surface of the flat plate portion.

24. A disk drive apparatus on which a disk is mounted, the disk drive apparatus comprising:

the spindle motor of claim 1;

an access portion configured to perform at least one of reading and writing operations with respect to the disk; and a housing containing the spindle motor and the access portion.

25. An electronic device provided with the spindle motor of claim 1.

* * * * *